No. 651,882. Patented June 19, 1900.
A. McKENZIE.
ACETYLENE GAS GENERATOR.
(Application filed Jan. 27, 1899.)
(No Model.)
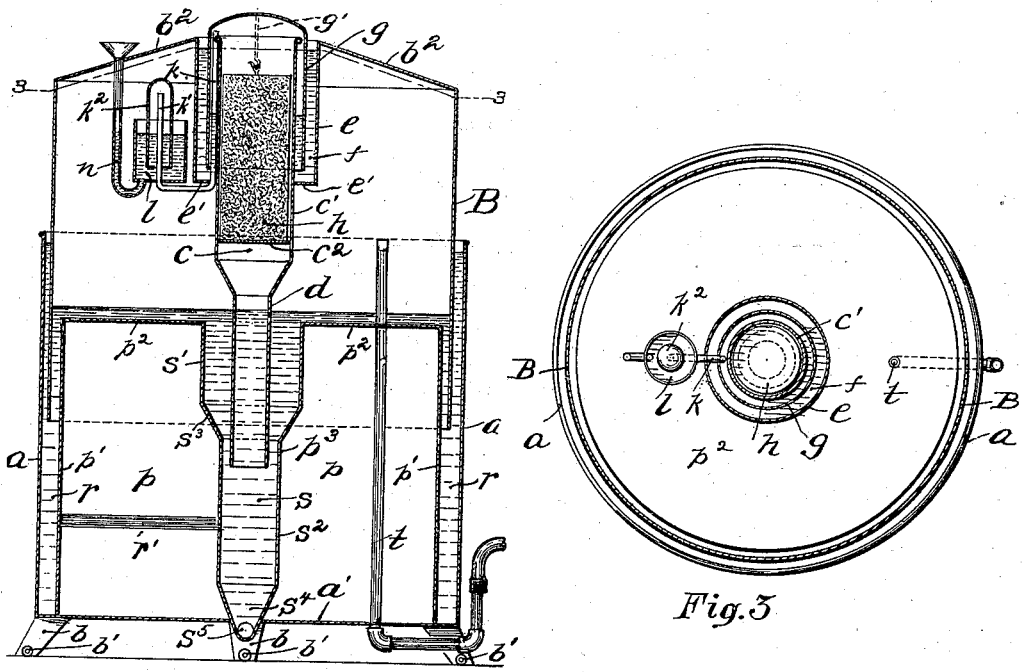
Fig.1
Fig.3
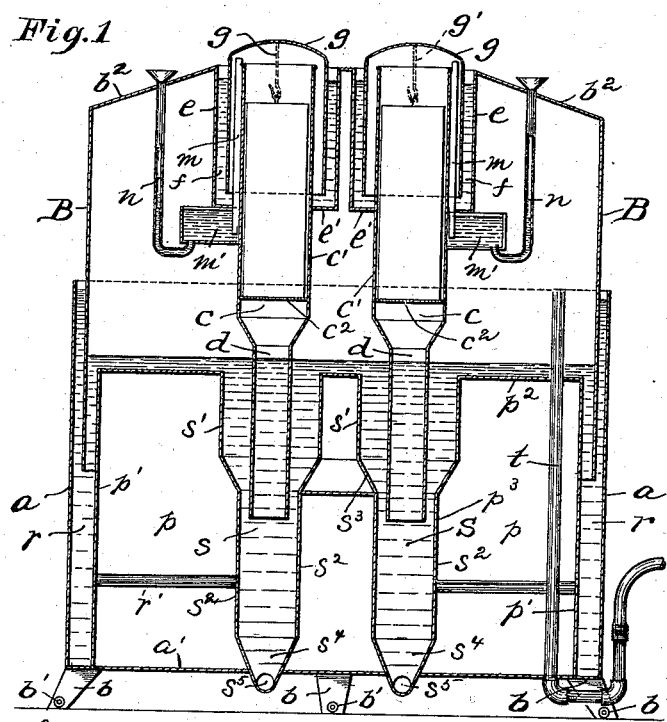
Fig.2
Witnesses:
Inventor:
Angus McKenzie
By Kay & Totten
Attorneys.

UNITED STATES PATENT OFFICE.

ANGUS McKENZIE, OF JAMESTOWN, NEW YORK, ASSIGNOR TO THE FENTON METALLIC MANUFACTURING COMPANY, OF SAME PLACE.

ACETYLENE-GAS GENERATOR.

SPECIFICATION forming part of Letters Patent No. 651,882, dated June 19, 1900.

Application filed January 27, 1899. Serial No. 703,566. (No model.)

*To all whom it may concern:*

Be it known that I, ANGUS MCKENZIE, a resident of Jamestown, in the county of Chautauqua and State of New York, have invented a new and useful Improvement in Acetylene-Gas Generators; and I do hereby declare the following to be a full, clear, and exact description thereof.

My invention relates to generators for acetylene gas, one object being to provide a cheap and light form of gas generator and holder adapted for portable plants.

It has for a further object the construction of such a generator and holder in which valves are done away with, all the joints at which the gas could be exposed being under the control of water seals.

It comprises, generally stated, a lower tank with an upper gas-holder telescoping therewith, the upper gas-holder carrying one or more gas-generating chambers each having a depending tube extending into the water of the tank and around the chamber an annular water-sealing chamber, within which an inverted-cup sealing-box enters and from which the carbid-basket is suspended, this generating-chamber having a pipe leading therefrom to a water seal supported in the upper part of the gas-holder above the water-level of the tank, through which the gas must pass to enter the gas-holder, and this second water-sealing chamber being provided with a gooseneck-filling opening by which the water-supply therein may be maintained.

It also comprises certain other improvements hereinafter more fully described.

To enable others skilled in the art to make and use my invention, I will describe the same more fully, referring to the accompanying drawings, in which—

Figure 1 is a longitudinal section of one form of gas-generating apparatus embodying the invention. Fig. 2 is a like view of another form; and Fig. 3 is a section on the line 3 3, Fig. 1.

Like letters of reference indicate like parts in each view.

As the generator embodying the invention is preferably employed as a portable generator, the tank $a$ is built of suitable heavy sheet metal and supported on feet $b$, preferably having casters $b'$, so providing for its movement in any direction around the building. Telescoping with this tank $a$ is the gas-holder B, which enters within the same and forms a water-seal joint therewith, as shown. This gas-holder has arranged in the upper part and preferably centrally thereof the gas-generating chamber $c$, which, as illustrated, is formed cylindrical and has below the same a contracted portion forming the depending tube $d$, which enters within the water of the tank, forming a seal for the lower part of the generator-chamber, while permitting the water to rise into contact with the calcium carbid supported therein. The generator-chamber with its depending tube are supported from the top wall $b^2$ of the gas-holder by means of the depending tubular case $e$, which is closed at the bottom by the horizontal annular wall $e'$, connecting this case and the generator-chamber, and which forms with the outer wall $c'$ of the generator-chamber the annular water-seal chamber $f$. Fitting within said annular water-seal chamber $f$ is the inverted cup $g$, which telescopes within such chamber, forming a water seal therewith to prevent escape of the gas into the atmosphere. This inverted cup is provided with the hook $g'$, from which the carbid-basket $h$ is hung within the chamber $c$. It is evident, of course, that the generator-chamber $c$ may itself support the carbid-basket—such, for example, by a grating $c^2$—though the above is a very simple construction. As the generator-chamber $c$ has water seals at each end, means must be provided to permit the passage of the gas therefrom, and for this purpose I employ the pipe $k$, leading from the upper end of the generator-chamber downwardly through the annular water-sealing space $f$ and thence into the sealing-cup $l$, which is arranged in two different ways, as found in Figs. 1 and 2. In Fig. 1 the pipe $k$ leads downwardly through the annular water-sealing space and then rises upwardly, as at $k'$, within the sealing-cup $l$, and fitting over the upper end of this part $k'$ of the pipe is placed the inverted-cup trap $k^2$, which fits within the sealing-cup $l$ and forms a gas seal therewith, the cup-trap resting loosely upon the pipe $k'$, while its base enters within the water within the sealing-cup $l$, so that the gas must pass into the trap $k^2$ and thence downwardly through the water of the sealing-cup $l$ to enter the generator-chamber. In Fig. 2 the pipe $m$ is carried downwardly through the annular water-sealing space directly into the sealing-cup $m'$, the cup-trap being dispensed with because the pipe enters downwardly into the sealing-cup and the gas being thus forced downwardly through the water contained within the sealing-cup. In order to insure the maintenance of the proper body of water to form the water seal within the sealing-cup $l$ or $m$, as the case may be, I employ the siphon-tube or gooseneck $n$, extending through the top of the gas-holder B and thence downwardly below the sealing-cup and rising into the base of the same, the pipe $n$ having a funnel at its upper end to provide means for feeding water into the sealing-cup, though access cannot be obtained directly to the same. In Fig. 2 I have shown two of these gas-generating chambers with the means of sealing the same and with the depending tubes, as above described, it being desirable in some of these generators, especially of larger size, to employ more than one generator-chamber, as it permits the charging of the one basket while the supply of gas is being kept up in the other generator-chamber.

As it is extremely desirable to employ a light-weight generator where a portable generator is used, I form in the lower part of the tank $a$ the annular air-chamber $p$, having the outer wall $p'$, the top wall $p^2$, and the inner wall $p^3$, the bottom $a'$ of the tank forming the base of this air-chamber. In this way I provide the annular water-space $r$ between the air-chamber $p$ and the outer wall of the tank within which the body of the gas holder B telescopes, it being simply necessary to have an annular space there for this purpose about an inch in width, and at the same time the inner wall $p^3$ forms the well $s$, which affords all necessary space for the entrance of the body of the generator-chamber $c$ and its depending tube into the water-space of the tank, this well $s$ corresponding substantially in shape to the generator-chamber and its depending tube, having the enlarged upper end portion $s'$, within which the generator-chamber enters, and the narrow base portion $s^2$ to receive the depending tube $d$, the connecting-wall $s^3$ between these two portions of the well being inclined to direct any lime or "ash," as it is termed, downwardly in the well $s$, and the lower end of said seal being funnel-shaped, as at $s^4$, to direct any ash which may collect from passing down through the tube $d$, while at the base of the well is a suitable faucet $s^5$ to provide for tapping out the ash. To maintain proper water-levels between the annular tank-chamber $r$ and well $s$, the water may be maintained at a point above the top wall $p^2$ of the air-chamber $p$, or a suitable pipe, as at $r'$, may extend between the annular chamber $r$ and the well $s$ through the air-chamber. Where more than one generator-chamber is used, extra wells $s$ are of course employed, as shown in Fig. 2. The gas-outlet pipe $t$ communicates with the gas-holder above the water-line and leads downwardly through the air-chamber $p$ and thence outwardly to a point where, if the invention is used with a portable generator, the connection can be made by means of flexible hose to carry the gas to the point of consumption.

In the use of the generator above described the tank $a$ is filled with water to the desired point, and both the water-sealing chamber $f$ around the generator-chamber $c$ and the sealing-cup $l$ or $m$ are filled with water, the latter being filled through the pipe $n$. A basket $h$ is filled with calcium carbid and either inserted in the chamber $c$, so as to rest upon the grating $c^3$, or while suspended from the sealing-box $g$ it is lowered into the chamber, the sealing-box entering the sealing-space $f$ and forming a water-seal joint with the same. If the generator contained no gas when the body of carbid was so lowered into the generator-chamber $c$, gas generation will immediately commence, and the gas generated by the decomposition of the water through the union of the hydrogen thereof with the carbon of the carbid will pass upwardly within the cup or cover $g$ and downwardly through the pipe $k$ and will rise within the sealing-cup $l$ and into the trap $k^2$ and downwardly through the water of the sealing-cup into the gas-holding chamber. This may continue until the gas under pressure and within the gas-holding chamber raises the gas-holder B and so draws the carbid out of contact with the water in the tank, when, as soon as all water adhering to the carbid is utilized in making gas, the making of the gas will be discontinued until the gas-holder is lowered by the consumption of gas so as to bring the carbid again into the water. When it is desired to recharge the generator, it is only necessary to pour water down into the filling-tube $n$, so as to insure a positive water seal for the pipe $k$ or $m$ leading from the generator-chamber $c$, a cup of water being sufficient to fill the same. The cover $g$ can then be raised from the generator-chamber, and as both ends of that chamber are sealed from the interior of the gas-holder, one by the cup $l$ or $m$ and the other by the depending tube $d$, there can be no escape of the gas contained in the gas-holder, and the generator can be quickly recharged and the operation of gas-making resumed by insertion of the newly-filled basket within the generating-chamber, as above described. In this way a very simple form of generator is provided and one which has no ordinary valves to be acted upon by the gas or to leak through ordinary causes, the only valve in the whole construction being that for tapping out the ash at the bottom of the well $s$. The generator can be made light, so as to be easily moved around, and it can be employed for all purposes for which portable acetylene-generators are found applicable, while the construction forms a very efficient one for an ordinary stationary generator.

The generator can of course be employed for the generation of gas by the contact of any liquid and solid, and, while especially described as an "acetylene-generator," the apparatus is of course claimed for such purposes.

What I claim as my invention, and desire to secure by Letters Patent, is—

1. The combination with a tank having an annular air-chamber formed therein and an annular water-sealing space between the air-chamber and the outer tank-wall, and a water-sealing well within the air-chamber, of a gas-holder telescoping with the tank and entering within the annular sealing-space and having a depending tube entering the well within the air-chamber, substantially as set forth.

2. The combination with a gas-holder having a gas-generating chamber supported thereby and a depending tube of smaller diameter than said chamber, of a tank having an inner annular air-chamber forming with the tank, an annular water-sealing space for the gas-holder and a water-well provided with an enlarged upper end to receive the gas-generating chamber and a contracted lower portion to receive its depending tube, substantially as set forth.

3. The combination with a gas-holder having a gas-generating chamber supported thereby provided with a depending tube, of a tank having an inner annular air-chamber forming with the tank-walls an annular water-sealing space for the gas-holder, and having a water-well to receive the depending tube of the generator-chamber, said well having a tapering face and a tapping-spigot at the base of the well, substantially as set forth.

In testimony whereof I, the said ANGUS MCKENZIE, have hereunto set my hand.

ANGUS McKENZIE.

Witnesses:
F. R. RIDELL,
A. F. WEBER.